Dec. 17, 1963 W. R. EPES 3,114,406
APPARATUS FOR CONNECTING TIRE CHAIN ENDS
Filed Nov. 1, 1961 3 Sheets-Sheet 1
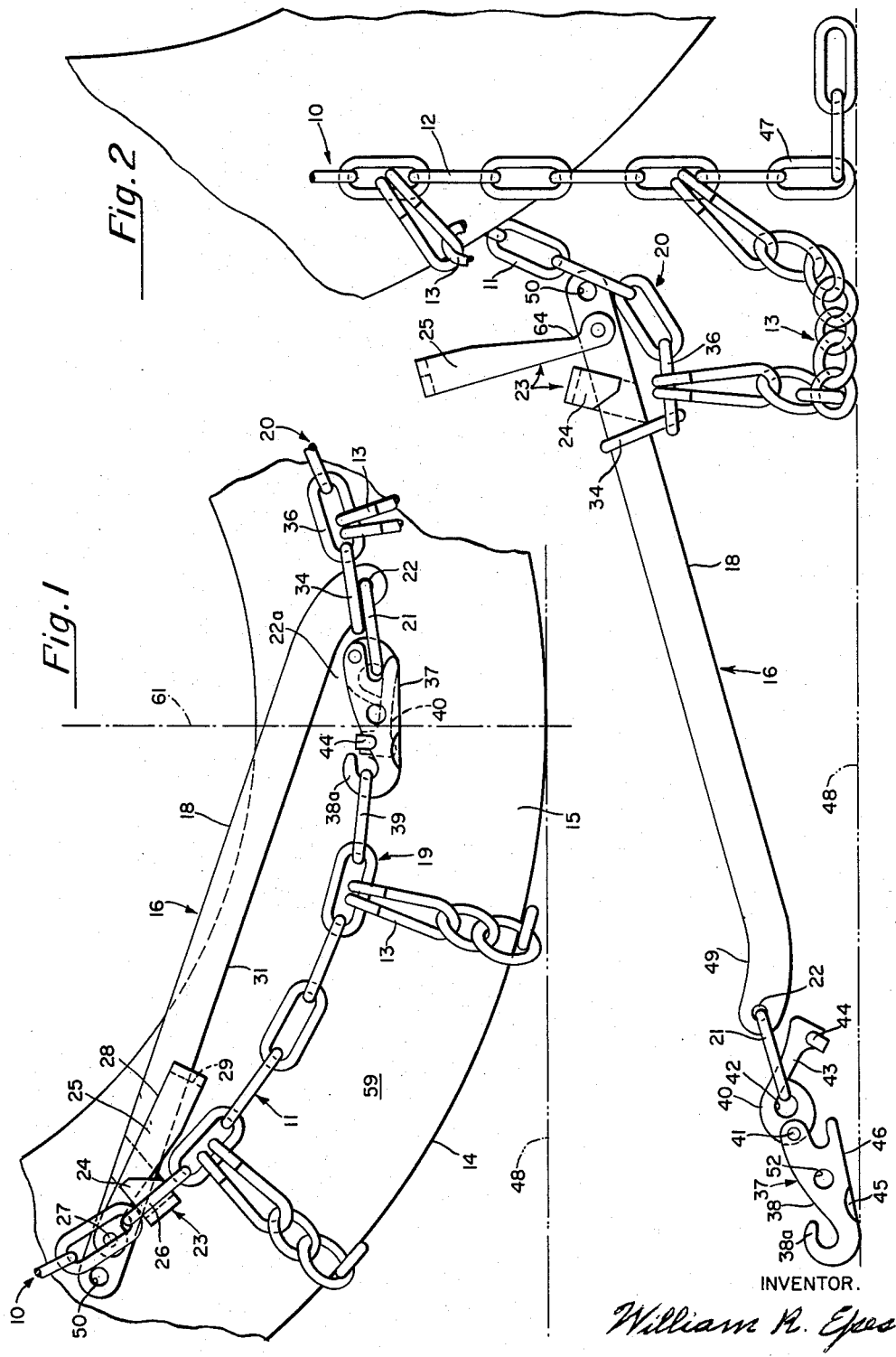
INVENTOR.
William R. Epes

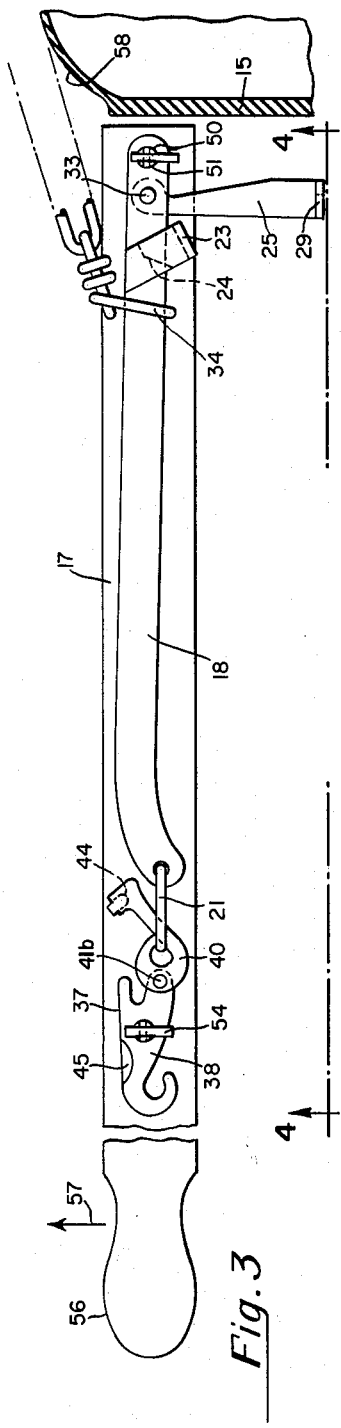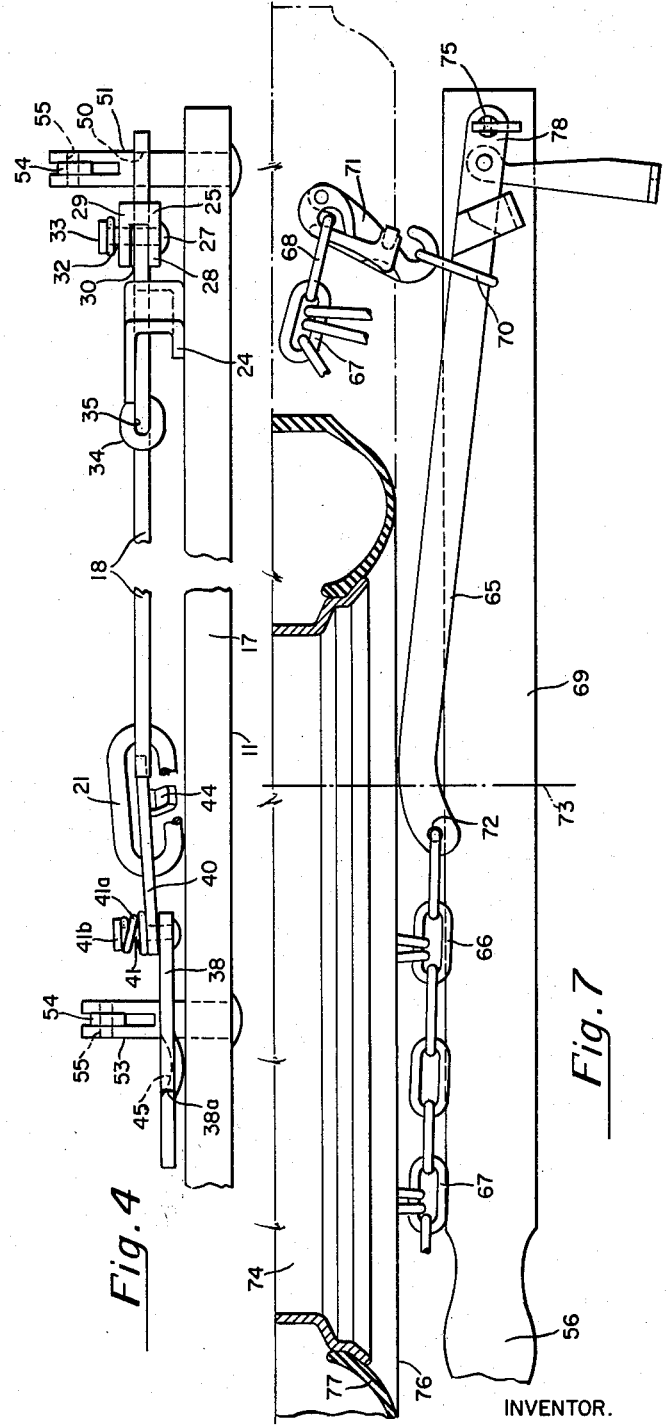

Dec. 17, 1963   W. R. EPES   3,114,406
APPARATUS FOR CONNECTING TIRE CHAIN ENDS
Filed Nov. 1, 1961   3 Sheets-Sheet 3
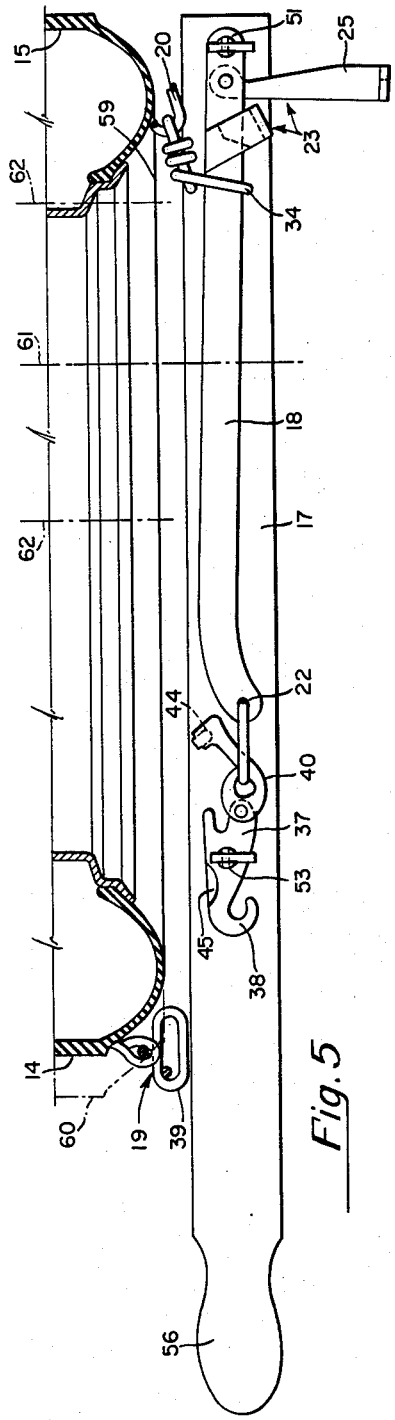
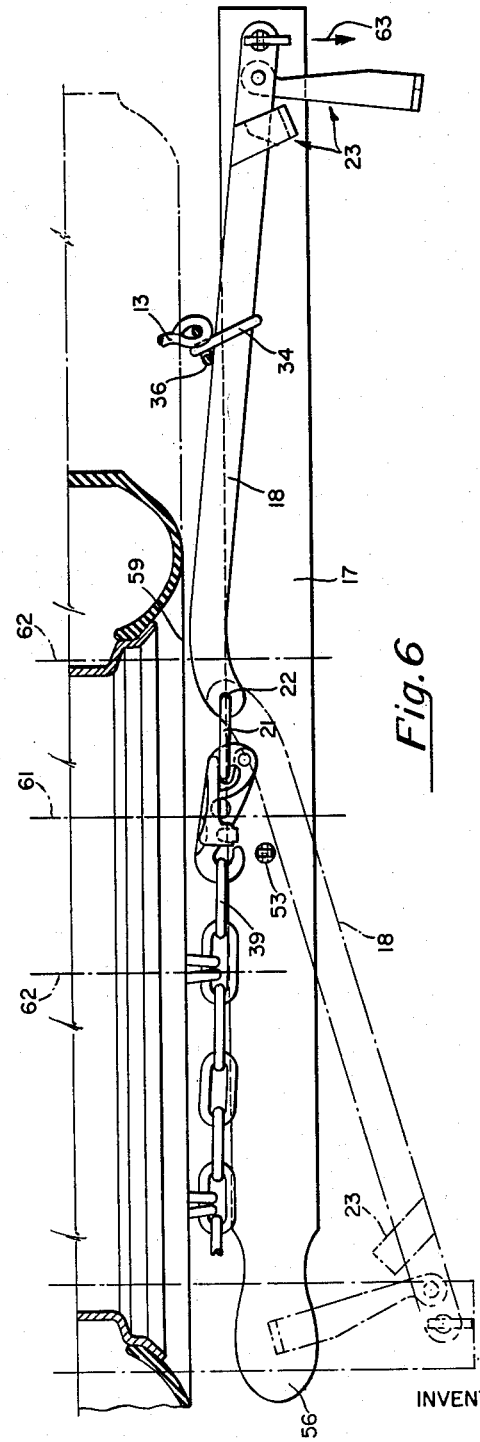
INVENTOR.
William R. Epes

United States Patent Office 3,114,406
Patented Dec. 17, 1963

3,114,406
APPARATUS FOR CONNECTING TIRE
CHAIN ENDS
William R. Epes, 127 Lefferts Road, Yonkers, N.Y.
Filed Nov. 1, 1961, Ser. No. 149,452
6 Claims. (Cl. 152—213)

This invention relates to an apparatus and a connector for connecting the ends of a ring chain of a tire chain of the type having ground gripping cross chains extending between the ring chains on each side of an inflatable tire. The invention also relates to the method of connecting the ends of the inside ring chain with the use of said apparatus.

The invention is particularly useful for connecting the ends of the inside ring chain after the tire chain has been draped over the tire in such a manner that its ends extend downwardly along the side walls of the tire on opposite sides of the axis of the wheel, and are adapted to be connected at or near the center of contact of the tire with the ground. The inside ring chain extends along the side wall of the tire on the side of the wheel opposite to the hub cap. Such side wall is hereinafter referred to as the blind side wall, as it cannot be seen from the hub cap side where the person applying the chain is located, such person is hereinafter referred to as the operator.

It is advantageous to connect the ends of the ring chain near the contact of the tire with the ground, because it may be done without moving the automobile, or jacking the wheel off the ground. However, it is difficult to connect the ends of the inside ring chain in such position when the ends are equipped with the conventional connector. It has been difficult to make such connection, because the connector cannot be seen on the blind side of the tire from the hub cap side of the tire, and further because simultaneous use of both hands at the contact of the tire with the ground on the blind side is required, and the average operator cannot do so without lying on the ground and thereby soiling his or her clothes.

It is the object of this invention to provide an apparatus and a dependable connector to enable the driver of an automobile to apply tire chains to a tire quickly and easily and without soiling his or her clothes.

The invention, its objects and advantages are disclosed in the following description and the accompanying drawings, in which;

FIG. 1 is an elevational view of a section of the blind side wall of a tire mounted on the wheel of an automobile and supported on the ground, and of a portion of the inside ring chain having its ends coupled together with the improved connector of this invention;

FIG. 2 is an elevational view of a portion of the outwardly facing side wall of the mounted tire showing the improved connector and one end of the inside ring chain slidably connected thereto, and the end of the outside ring chain at the same end of the tire chain, as such elements appear after the tire chain has been draped over the tire in the first step of applying the chain;

FIG. 3 is a plan view on a reduced scale of the cross section of a portion of the tire and the connector shown in FIG. 2 after the connector has been rotated 90 degrees about its long axis in a clockwise direction as viewed from the left, and showing the connector mounted on a push and pull member having a portion removed at the left end;

FIG. 4 is an enlarged edge view of portions of the connector and push and pull member of FIG. 3, taken on line 4—4 thereof, the intermediate portions of such members being removed;

FIGS. 5 and 6 are reduced plan views of a portion of the lower sector of the tire showing the blind side wall of the tire and of the connector mounted on the push and pull member in successive positions in the operation of connecting the ends of the inside ring chain, and making the connection as shown in FIG. 1;

FIG. 7 is a modification of the invention shown in FIGS. 1 to 6 inclusive, and showing the elements in the step corresponding substantially to the step shown in FIG. 6.

This invention is illustrated in the drawings in reference to a tire chain 10 having inside and outside ring chains, 11 and 12, and ground gripping cross chains 13 extending therebetween over the tread surface 14 of a tire 15.

This invention comprises a connector 16 shown in FIGS. 1 and 2 and in combination with a push and pull member 17, shown in FIGS. 3 to 6 of the drawings. Referring to FIG. 1, the connector 16 comprises a bar 18, which unites ends 19 and 20 of the inside ring chain 11. The bar 18 is pivotally connected to the end 19 of the ring chain 11 by a link 21 having one end pivoted in an aperture 22 in one end of the bar 18, which forms a pivot point for the bar. The bar 18 extends reversely from the pivot point 22 along the end 19 of the inside ring chain, and forms a loop 22a between it and the chain. The rotatable end of the bar 18 is releasably secured to the end 19 by a fastener 23, which comprises a hook 24 and a locking lever 25 secured to the end of the bar 18. The hook 24 extends into a side chain link 26, and the locking lever 25 is pivotally attached to the bar by a rivet 27. The link 26 is locked in the hook 24 by the locking lever which is adapted to be pivoted into the hook 24 over one side of the link 26. The rotatable end 28 of the locking lever 25, as shown in FIG. 4, is provided with a projection 29 which extends at right angles to the flat side of the locking lever 25. The projection 29 has a notch 30 formed therein which is received by the bottom edge 31 of the connector bar 18 (as viewed in FIG. 1) to lock the lever 25 in the hook 24. As shown in FIG. 4, the lever 25 is resiliently held against the side of the connector bar 18 by a coiled spring 32 maintained in compression between the head 33 of the rivet 27 and the connector bar 18. The rivet 27 extends through the coil of the spring 32 similar to the construction shown at the left in FIG. 4, and which is described below.

The end 20 of the inside ring chain 11 is connected to the connector bar 18 by a link 34 which is slidable between the pivot 22 at one end of the bar and the fastener 23 at the other end of the bar. The space between the sides 35 of the link 34 should be insufficient to permit the bar 18 to rotate about its long axis in the link, or for the link 34 to rotate from end to end in the adjacent link 36, to which it is connected, because upon either occurrence the orientation of the bar 18 in respect to the ring chain may be changed from that shown in FIG. 1. For example, if the bottom edge 31 of the bar 19 should be reversed in respect to the top edge as shown in FIG. 1, the ends of the ring chain could not be connected.

In the modification shown in FIG. 1, the connector bar 18 is permanently connected to the end 20 of the inside ring chain by the slidable link 34, but the bar 18 may be connected and disconnected from the end 19 of the ring chain 11 by a conventional fastener 37, which is permanently connected by the link 21 to the bar 18.

As shown more clearly in FIG. 2 the conventional fastener 37 comprises a hook member 38 having a hook 38a which is adapted to be secured in a link 39 (FIG. 1) in the end 19 of the ring chain, which is extended to the pivot point 22 of the bar 18 by the fastener 37 and the link 21 extending between the fastener and the pivot point. The link 39 is retained in the hook 38a by a locking member 40 pivoted on a pin 41 affixed to the opposite end of the hook member 38. The locking member 40 is resiliently held against the side of the hook member 38 by a coiled spring 41a (FIG. 4) and is retained in compression between the head 41b and the locking member 40 in the same manner as the locking lever 25 of the fastener 23 is held by the spring 32 against the connector bar 18. An aperture 42 is formed in the locking member 40, and the link 21 is secured in the aperture. The end of the arm 43 of the locking member 40 is provided with a bent over catch 44. The arm 43 is rotatable in a clockwise direction as viewed in FIG. 2 to bring the arm into its locking position as shown in FIG. 1. An indentation 45 is formed in the side of the hook member 38 on which the locking member 40 is pivoted. The indentation extends from the edge 46 and decreases in depth towards the opposite edge of the hook member 38, so as to guide the catch 44 over the side of the hook member on which the locking member is pivoted. When the locking member 40 is in the position shown in FIG. 1, the bent over portion of the catch 44 embraces the upper edge of the hook member 38, and thereby prevents the locking arm 43 from being rotated in the counter-clockwise direction (as viewed in FIG. 1) by the pull of the link 21 thereon.

Now, the operation of connecting the ends of the tire chain will be described. After the tire chain has been draped over the top tread surface of the tire 15, the end 47 of the outside ring chain 12 and the end 19 of the inside ring chain 11 will be positioned on or near the supporting surface 48 of the tire 15, as shown in FIG. 2. In such position the end 19 with the connector 16 attached thereto can be readily reached by the operator. The connector bar 18 is arranged in the position shown in FIG. 2 with the hook 24 of the fastener 23 facing outwardly towards the operator and extending downwardly, with the curved edge 49 on the opposite end of the bar 18 extending upwardly. Preferably, the locking lever 25 should also be extending upwardly. The bar 18 is then rotated about its long axis 90 degrees and secured to the push and pull member 17 (FIG. 3). The end of the bar 18 having the locking lever 25 attached thereto is secured to the push and pull member 17 by extending an aperture 50 in the end of the bar over a post 51, on the push and pull member 17 (FIG. 4). The opposite end of the bar 18 is secured to the push and pull member 17 by extending an aperture 52 in the hook member 38 of the fastener 37 over a post 53, on the push and pull member 17. Each of the posts 51 and 53 is provided with a bar 54 which is pivoted on a pin 55, in the top of each of the posts 51 and 53, which when turned perpendicular to the axis of the post, the bar 18 is secured on the push and pull member 17. When the levers 54 are turned so that they extend in the direction of the axis of the posts, the apertures 50 and 52 in the bar, and the fastener 37, respectively, may be inserted over the posts 51 and 53, and may also be removed therefrom. The hand grip 56 of the push and pull member 17 is rotated about the opposite end of the member 17 in the direction of the arrow 57, and around the adjacent torus 58 of the tire 15 until the push and pull member 17 is brought alongside the blind side wall 59 of the tire 15 as shown in FIG. 5. The hand grip 56 of the push and pull member 17 will then extend beyond the vertical projection 60 of the horizontal diameter of the tire 15 on the right of the operator. Such projection is shown at the left of FIG. 5, but it will be understood that the operator is positioned on the hub cap side of the wheel opposite the blind side 59 at all times when he is applying the tire chain, including the operations hereinbefore described and hereinafter to be described.

The dot and dash line 61 represents the vertical projection of the rotational center of the tire 15 and the space between the dot and dash lines 62 represents the vertical projection of the usual length of contact the inflatable tire makes with the supporting surface when carrying the weight of the automobile. Therefore, it can be seen that the hand grip 56 can be easily reached by the operator on the hub cap side of the tire as well as the fastener 37 secured to the push and pull member 17. However, the operator usually grasps the grip 56 and pulls it further to his right and then removes the fastener 37 from the post 53 with his left hand. The fastener 37 is pulled towards the operator and under the tread 14 of the tire, and while the hook member 38 is held by the left hand of the operator, the link 39 on the end 19 of the ring chain is placed and locked in the hook 38a by the right hand of the operator.

After locking the fastener 37 onto the link 39, the push and pull member 17 remains in the position shown in FIG. 5 and it will be noted that the slidable link 34 is positioned at the opposite end of the bar 18 adjacent to the fastener 23. The operator grasps the end 47 (FIG. 2) of the outside ring chain 12 with his left hand and pulls it to his right. While pulling on the end 47, he pushes the push and pull member 17 to his left along the blind side wall 59 of the tire 15 to the position shown in FIG. 6. The pull on the end 47 is transmitted to the slidable link 34 through the endmost cross chain 13 of the end 19 of the inside ring chain 11. The combined pull and push causes the slidable link 34 to be moved away from the fastener 23 towards the middle point of the bar 18 and to the position shown in FIG. 6. The operator then rotates the end of the push and pull member 17 opposite the grip 56 about such grip and in the direction of the arrow 63 with his right hand, while maintaining the push and pull member 17 pushed to his left, so as to rotate the bar 18 about the pivot point 22 on the link 21. The slidable link 34 rides along the bar 18 towards the pivot point 22. The combined push and rotational movement of the push and pull member 17 and the rotation of the bar 18 is continued until the bar 18 is about parallel to the axis 61 of the wheel. Then a combined pull and rotational movement is applied to the push and pull member 17 and the bar 18 until these members have been brought into the position shown by the dot and dash lines in FIG. 6. Preferably, the rotational end of the bar 18 is maintained at the level of its pivoted end during its above pivotal movement of the bar. The end of the bar 18 having the fastener 23 thereon may be removed from the push and pull member 17 in such position, but for convenience the end of the bar 18 is moved closer to the blind side 59 of the tire before its removal from the push and pull member 17. In fact, the post 53 to which the bar 18 is fastened may be moved in the plane of rotation of the tread 14 of the tire, where it may be readily seen, for the removal of the bar 18 therefrom.

After removing the bar 18 from the post 53, the operator grasps the locking lever 25 with his right hand and rotates it about its pivot 27 through 180 degrees to the opposite side of the bar 18. He then turns the bar 18 about its long axis in a clockwise direction, looking towards the pivot point 22 from the opposite end of the bar, until the rotatable end 28 of the lever 25 points upwardly at an angle of about 45 degrees to the plane of the rotation of the tire. In such position the rotatable end of the bar 18 is placed against the blind side wall 59 of the tire above the ring chain 11. The hook 24 is moved downwardly along the blind side wall 59 between the ring chain 11 and the side wall while holding the lever 25 in the above angular position and until the hook 24 extends below the ring chain 11. The locking lever 25 is then rotated on the long axis of the bar 18 to substantially a vertical position, and it is then pulled upwardly, until the hook 24 extends into the enclosure between the sides of the link 26 and is stopped in its upward travel by contact with the link at the bottom of the hook. The lever is then rotated about its pivot point 27 towards the hook 24 until the projection 29 on the end of the lever 25 extends below the lower edge 31 of the bar 18. To so rotate the lever, the projection 29 is pulled away from the bar 18 to enable it to pass over the top edge of the bar, which is made possible by the resilient action of the spring 32 at the pivot point 27. When the projection 29 has passed the lower edge 31 of the bar 18, the spring 32 forces the lever flatly against the bar 18 and the notch 30 in the projection 29 is extended in front of the lower edge 31, and embraces it when the projection moves upwardly. A recess 64 is formed in the edge of the lever 25 adjacent its pivot point 27 to receive the side of the link 26, and the link is retained in the hook 24 between the recess 64 and the bottom of the hook, because any upward pressure of the link on the lever 25 forces the notch 30 in the end thereof, over the bottom edge 31 of the bar 18 and prevents the lever from rotating out of the hook.

The end 47 of the outside ring chain 12 is then connected to the opposite end of the ring chain which is provided with a fastener similar to the fastener 37. Such connection is made in the conventional manner and this can be easily done, because the fastener and the ends of the outside ring chain are readily accessible to both hands of the operator and also are visible to him. This completes the operation of applying the tire chain to the tire 15, but if desired, a spreader may be applied to the outside ring chain, in the conventional manner.

To remove the tire chain, the tire is brought into the position shown in FIG. 1 so that the pivotal end of the bar 18 is at, or near, the contact of the tire with the ground 48. In this position, the locking lever 25 is readily accessible to the right hand of the operator, and he grasps the end of the lever having the projection 29 thereon and releases the notch 30 therein from the bar 18 by pulling the lever downwardly and at the same time away from the bar 18. The projection 29 is thereby removed from the plane of the bar 18. Then, the lever 25 is rotated upwardly about the pivot 27 and out of the hook 24 to a position substantially perpendicular to the bar 18. The operator with his hand on the upwardly projecting end of the lever 25 pushes the hook 24 downwardly below the ring chain 11 and then rotates the bar 18 about its long axis through an angle of about 45 degrees by rotating the end 28 of the lever 26 away from the blind side wall 59 of the tire. In such position, the hook 24 may be pulled upwardly without engaging the link 26 of the ring chain. After so pulling the hook 24 upwardly and free from the ring chain, that end of the bar 18 is carried away from the blind side wall 59 of the tire and thrown to the left of the operator about its pivot point 22. The end 19 of the ring chain 11 is grasped with the right hand of the operator and is pulled towards his right. In doing so, the bar 18 will slide through the slidable link 34 until the opposite end of the bar is arrested by the fastener 23 thereon. When the end of the bar has been pulled against the slidable link 34, the fastener 37 and the link 39 locked therein will be considerably to the right of the contact of the tire with the ground and may be pulled around the torus of the tire towards the operator and underneath the overhanging tread of the tire. When the fastener 37 has been pulled in such position it may be readily reached and operated with either hand or both hands of the operator to release the hook 38a from the link 39 by operating the locking arm 43 in the reverse manner as described hereinbefore. That is, the end of the bent over catch 44 is rotated until the catch does not embrace the edge of the hook member 38, and then the free end of the arm 43 is moved away from the side of the hook member 38 and rotated to the position shown in FIG. 2. The hook 38a is then disengaged from the link 39. The disengagement of the hook 38a completely disconnects the ends 19 and 20 of the inside ring chain from each other. The ends of the outside ring chain 12 are then disconnected in the conventional manner. The chain may then be removed in its entirety from the tire by either pulling it off the tire, or by starting the car to roll and rolling the chain off onto the ground by the traction of the tire tread 14 in contact with the cross chains 13.

The modification of the invention disclosed in FIG. 7 differs from the invention disclosed in FIGS. 1 to 6 in that the connector bar 65 is directly pivoted and permanently attached to the end 66 of the inside ring chain 67, and it is detachably secured to the end 68 of the ring chain, and only one end of the bar 65 is secured to the push and pull member 69. The apparatus is shown in FIG. 7 in a position corresponding to the position of the apparatus in FIG. 6, excepting the slidable link 70 on the bar 65 has been connected to the fastener 71 corresponding to the fastener 37 in the previously described apparatus and before the slidable link has been pulled towards the pivotal connection 72 of the bar to the end 66 of the ring chain. All of the other members of the modified apparatus, including the connector and the push and pull member are the same as the corresponding members of the apparatus disclosed in FIGS. 1 to 6, but the operation of the modified apparatus is different, and such operation will now be described.

The tire chain is draped over the tire as described hereinbefore, excepting the connector bar 65 is located at the right of the operator and the fastener 71, then detached from the link, is located at the left of the operator, on opposite sides of the vertically projected axis 73 of the wheel 74. In such draped position the rotatable end of the bar 65 is pivotally attached to the post 75 on the push and pull member 69, which is then moved along the blind side wall 76 of the tire 77, in the direction to the left of the operator, and to the position shown in FIG. 7. The fastener 71, permanently connected to the opposite end 68 of the ring chain 67 is then attached to the slidable link 70. Then the operator grasps the end of the outside ring chain (not shown) on the same end of the tire chain as the end 68, and pulls the slidable link 70 towards the pivot point 72 to a position corresponding to the position of the link 34 shown in FIG. 6. The subsequent steps in the operation of connecting the ends 66 and 68 of the inside ring chain and fastening the rotatable end 78 of the connector bar 65 in the position corresponding to that shown in FIG. 1 is carried out as hereinbefore described in reference to FIGS. 1 to 6.

All of the operations described hereinabove may be done by the operator without undue exertion and without soiling his or her clothes, and in less time than that required to apply a tire chain with the use of means normally available to the operator in a home garage, or on the road. Such operations may be performed by the operator in a bent over or squatting position and without kneeling or extending more than his forearm underneath the fender of the automobile. These operations can be performed with the use of gloves on the hands of the operator, which will prevent even the soiling of his hands. However, it is recommended that gloves provided with gauntlets be used to prevent accidental contact of the sleeves of the operator against any dirt that may be deposited on the tire or on the chains.

Having thus described my invention, what I claim and desire to protect by Letters Patent is:

1. In a tire chain, a connector for connecting the ends of the inside ring chain of said tire chain in its mounted position on a bar comprising a bar having a pivoted end, a rotatable end, a link of said inside ring chain slidable on said bar between its said ends, means on each end of said bar for securing said link against removal therefrom, means connecting said pivoted end of said bar to one end of said ring chain, means connecting said slidable link to the other end of said ring chain, one of said connecting means comprising a fastener adapted to connect and disconnect one end of said ring chain to and from said bar, means for securing said rotatable end of said bar in said mounted position to said end of said chain connected to said pivoted end of said bar, and means on said rotatable end of said bar for connecting a push and pull member thereto.

2. In a tire chain, a connector for connecting the ends of the inside ring chain of said tire chain in its mounted position on a tire, comprising a bar having a pivoted end and a rotatable end, an end link of said inside ring chain slidable on said bar between its said ends, means connecting the pivoted end of said bar to one end of said ring chain, means connecting said slidable link to the other end of said ring chain, one of said connecting means comprising a fastener adapted to connect and disconnect one end of said ring chain to and from said bar, means for releasably securing said rotatable end of said bar in said mounted position to said end of said chain connected to said pivoted end of said bar, and means on each end of said bar for securing said slidable link against removal therefrom when said means for securing said rotatable end of said bar is released.

3. In a tire chain including the subject matter of claim 2, wherein said bar has an elongated cross section and said slidable link has elongated sides spaced from the longer sides of said cross section insufficiently to permit said link to rotate around said bar and also insufficiently to permit said means connecting said slidable link to the end of said ring chain to pass from one end of said slidable link to the other.

4. In a tire chain including the subject matter of claim 2, wherein said last mentioned means for securing said rotatable end of said bar comprises a hook secured to said bar, and adapted to extend transversely of and into a link of said ring chain, a locking lever pivoted on said bar and adapted to be pivoted over said link to lock said link in said hook, and means for locking said lever in its pivoted position.

5. In a tire chain, a connector for connecting the ends of the inside ring chain of said tire chain in its mounted position on a tire comprising a bar having a pivoted end and a rotatable end, a link slidably mounted on said bar, a connection between one end of said ring chain and said pivoted end of said bar and a connection between the other end of said ring chain and said link, a releasable fastener interposed in one of said connections, said bar extending reversely along the end of said ring chain connected to its pivoted end to form a loop between said bar and said chain, said slidable link being retained in the end of said loop at the pivoted end of said bar, means for releasably securing said rotatable end of said bar to the said chain at the opposite end of said loop, a stop on and adjacent to each end of said bar, said link being adapted to slide between said stops and being secured against removal from said bar by said stops when said rotatable end of said bar is released.

6. In a tire chain, a connector for connecting the ends of the inside ring chain of said tire chain in its mounted position on a tire comprising a bar having a pivoted end and a rotatable end, a link slidably mounted on said bar, a releasable fastener connecting one end of said ring chain to said pivoted end of said bar and the other end of said ring chain being connected to said slidable link, said bar extending reversely along said releasable fastener end of said ring chain to form the closed end of a loop between said bar and said ring chain within which said link is retained, means for releasably securing said rotatable end of said bar to said releasable fastener end of said ring chain, a stop on and adjacent to each end of said bar for securing said link against removal from said bar, and said link being adapted to slide between said stops when said rotatable end of said bar is released.

References Cited in the file of this patent
UNITED STATES PATENTS

| | | |
|---|---|---|
| 1,508,245 | Petracek | Sept. 9, 1924 |
| 2,743,754 | Maresh | May 1, 1956 |
| 2,771,930 | Pike | Nov. 27, 1956 |
| 2,865,422 | Royer | Dec. 23, 1956 |